(12) United States Patent
Johnson

(10) Patent No.: US 6,593,723 B1
(45) Date of Patent: Jul. 15, 2003

(54) INTEGRATED WALL APPARATUS FOR DELIVERING UNINTERRUPTED ELECTRICAL POWER

(76) Inventor: Calvin G. Johnson, 515 S. Main St., Clio, SC (US) 29525

( * ) Notice: Subject to any disclaimer, the term of this patent is extended or adjusted under 35 U.S.C. 154(b) by 0 days.

(21) Appl. No.: 10/348,585

(22) Filed: Jan. 21, 2003

(51) Int. Cl.[7] ............................................... H02J 7/00
(52) U.S. Cl. ............................................................ 320/113
(58) Field of Search ................................. 320/113, 103, 320/107, 110; 307/64, 66, 65, 125, 130, 131, 44, 48, 49, 80, 85–87, 141, 141.4

(56) References Cited

U.S. PATENT DOCUMENTS

| | | | |
|---|---|---|---|
| 5,244,411 A | 9/1993 | Schinke et al. | 439/516 |
| 5,396,164 A | 3/1995 | Anegawa | 370/431 |
| 5,801,513 A * | 9/1998 | Smith et al. | 320/113 |
| 5,818,204 A | 10/1998 | Banyas et al. | 320/150 |
| 5,844,328 A | 12/1998 | Furst | 307/66 |
| 5,869,949 A | 2/1999 | Nishikawa et al. | 320/101 |
| 6,040,640 A * | 3/2000 | Gehre et al. | 307/66 |
| 6,124,797 A | 9/2000 | Mercado | 340/636 |
| 6,275,006 B1 | 8/2001 | Koike et al. | 320/125 |
| 6,323,622 B1 | 11/2001 | Lin et al. | 320/132 |

* cited by examiner

Primary Examiner—Edward H. Tso
Assistant Examiner—Pia Tibbits
(74) Attorney, Agent, or Firm—Dale J. Ream (57) ABSTRACT

An apparatus for providing uninterrupted electrical power includes a pair of guide tracks mounted to adjacent studs within a wall structure. A rechargeable battery may be mounted for slidable movement along the guide tracks such that additional batteries may be added successively or removed. The apparatus includes a logic circuit electrically connected to a power source and to the battery. A control panel provides access to the circuit and battery. A plurality of electrical outlets are positioned on the control panel. A master selector switch on the control panel is connected to the logic circuit and controls whether the outlets receive power from the conventional power source, from the battery when conventional power is unavailable, or not at all. Individual selector switches regulate whether particular receptacles may receive battery power. A plurality of dials are positioned on the control panel for user regulation of current voltage delivered to particular outlets.

20 Claims, 10 Drawing Sheets

INTEGRATED WALL APPARATUS FOR DELIVERING UNINTERRUPTED ELECTRICAL POWER

BACKGROUND OF THE INVENTION

The present invention relates generally to uninterrupted power supply devices and, more particularly, to an uninterrupted power supply apparatus for integration in a wall structure and which includes master and individual switches for user control of which electrical outlets may receive battery power.

Uninterrupted power supply ("UPS") devices are commonly used for maintaining a supply of electrical current to computers and other electronic devices. A conventional UPS would include multiple electrical outlets and a battery such that electronic devices plugged into the UPS would draw current from the battery if the AC electrical power source was unavailable. Typically, the time to transfer from AC to battery power is very short such that data is not lost.

Although assumably effective for their intended purposes, the existing devices are not well-suited for providing uninterrupted power to an entire room, office, or to equipment that consumes large amounts of electricity. Until now, such a utility function would require multiple independent UPS devices that would be obtrusive, unattractive, and functionally inefficient.

Therefore, it would be desirable to have an uninterrupted power supply apparatus that is hidden within a wall structure while providing uninterrupted power to multiple electronic devices. Further, it would be desirable to have an apparatus which may optionally include multiple batteries easily accessible through a control panel. Still further, it would be desirable to have an apparatus in which a plurality of electrical outlets may be individually controlled regarding whether battery power flows thereto.

SUMMARY OF THE INVENTION

An apparatus for providing uninterrupted electrical power according to the present invention includes a pair of guide tracks that may be mounted vertically to adjacent studs of a wall structure. At least one storage cell, e.g. a rechargeable battery, is mounted for slidable movement along the guide tracks such that additional storage cells may be successively added. The apparatus includes a control unit positioned adjacent one of the guide tracks and which includes a logic circuit. The logic circuit is electrically connected to an AC power source and to the at least one storage cell. The logic circuit is capable of switching from drawing current from the AC power source to drawing current from the at least one storage cell when AC power is interrupted. The apparatus includes a control panel having a master selector switch that may be toggled between "off", "on", and "on-with-battery" configurations. In the "on" configuration, current flowing to a plurality of electrical outlets will only be drawn from the main power source and no storage cell backup will be provided in case of power interruption. In the "on-with-battery" mode, current will be drawn from the at least one storage cell if AC power is interrupted. This mode selector switch allows a user to determine whether or not it is necessary to drain power from the storage cell to maintain operation of certain electric devices. For example, if no critical devices are in operation, a user may choose not to employ the battery backup feature. Further, if non-critical electronic devices such as lamps or electric heaters are connected to the apparatus overnight, over a weekend, or longer periods of time, a user may choose not to drain the storage cell in case of a power outage.

In addition, the apparatus includes individual selector switches which allow a user to regulate whether specific electrical outlets will draw current from the storage cell. In other words, a user may exercise control over which electric devices are critical and therefore worthy of battery backup and which devices do not justify consumption of storage cell energy. Since various devices will be plugged into various outlets over time, having a quick and easy means for regulating storage cell usage is important for efficient management of overall storage cell energy. Further, each electrical outlet is associated with a dial with which a user may manually regulate the voltage of current flowing thereto. Certain electric devices like lights or electric heaters can operate at less than full power. Thus, using an appropriate dial to reduce output voltage will save power, this being especially important if current is being drawn from the storage cell when AC power is interrupted.

Therefore, a general object of this invention is to provide an apparatus for providing uninterrupted power to electric devices that are connected to the apparatus.

Another object of this invention is to provide an apparatus, as aforesaid, which may be mounted and substantially hidden within a wall structure.

Still another object of this invention is to provide an apparatus, as aforesaid, to which multiple storage cells may be successively added or removed by a user.

Yet another object of this invention is to provide an apparatus, as aforesaid, having "off", "on", and "on-with-battery" modes that are selectable by a user.

A further object of this invention is to provide an apparatus, as aforesaid, having electrical outlets that may be individually regulated as to whether storage cell current may flow thereto in case of AC power interruption.

A still further object of this invention is to provide an apparatus, as aforesaid, in which the voltage of current flowing to an electrical outlet may be individually regulated by a user.

Another object of this invention is to provide an apparatus, as aforesaid, which charges the storage cell when AC power is available.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

An apparatus for providing uninterrupted electrical power according to the present invention will now be described in detail with reference to FIGS. 1 through 10 of the accompanying drawings.

Figure 1:
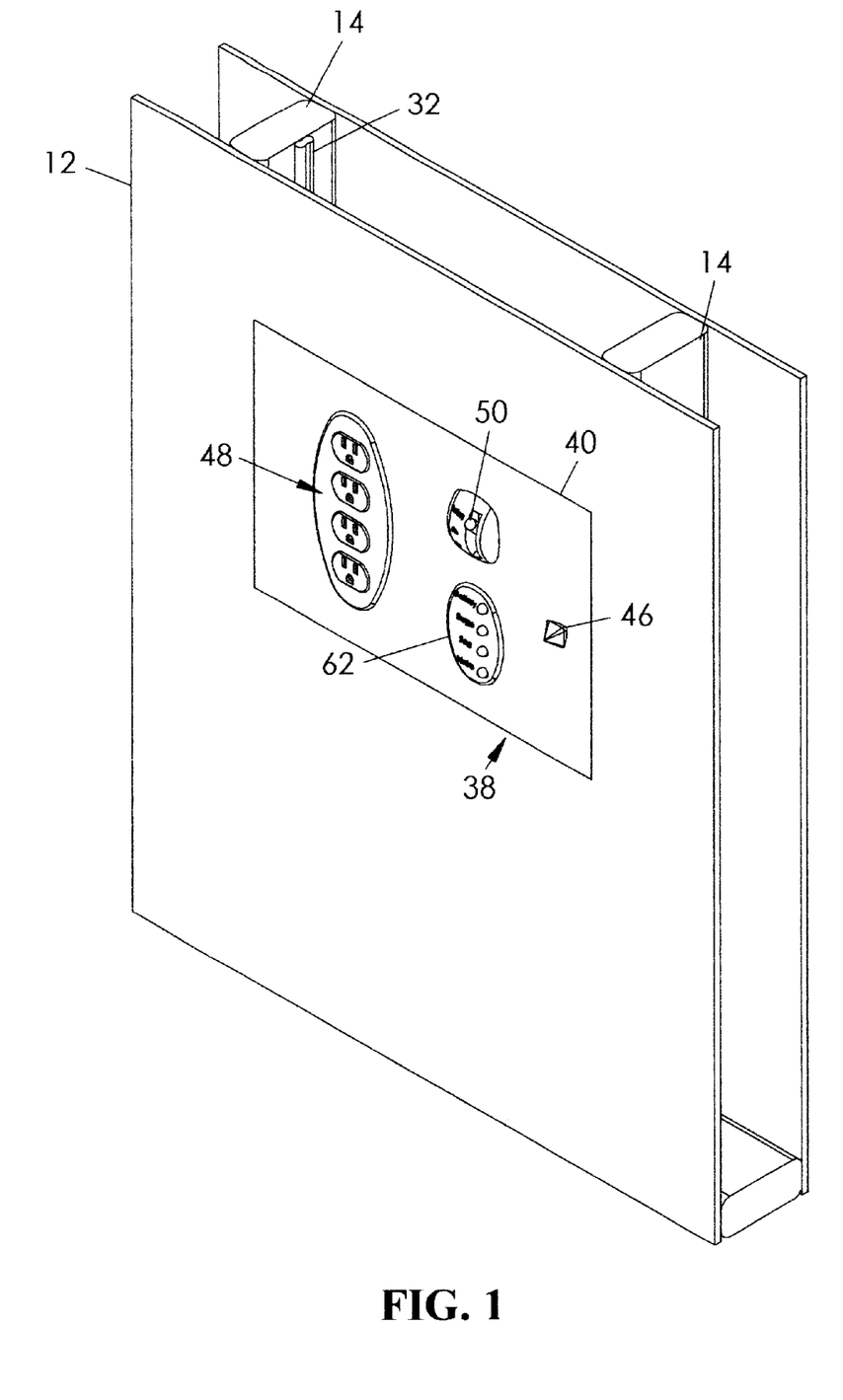
FIG. 1 is a perspective view of an apparatus for providing an uninterrupted power supply mounted in a wall structure according to one embodiment of the present invention.
Figure 2:
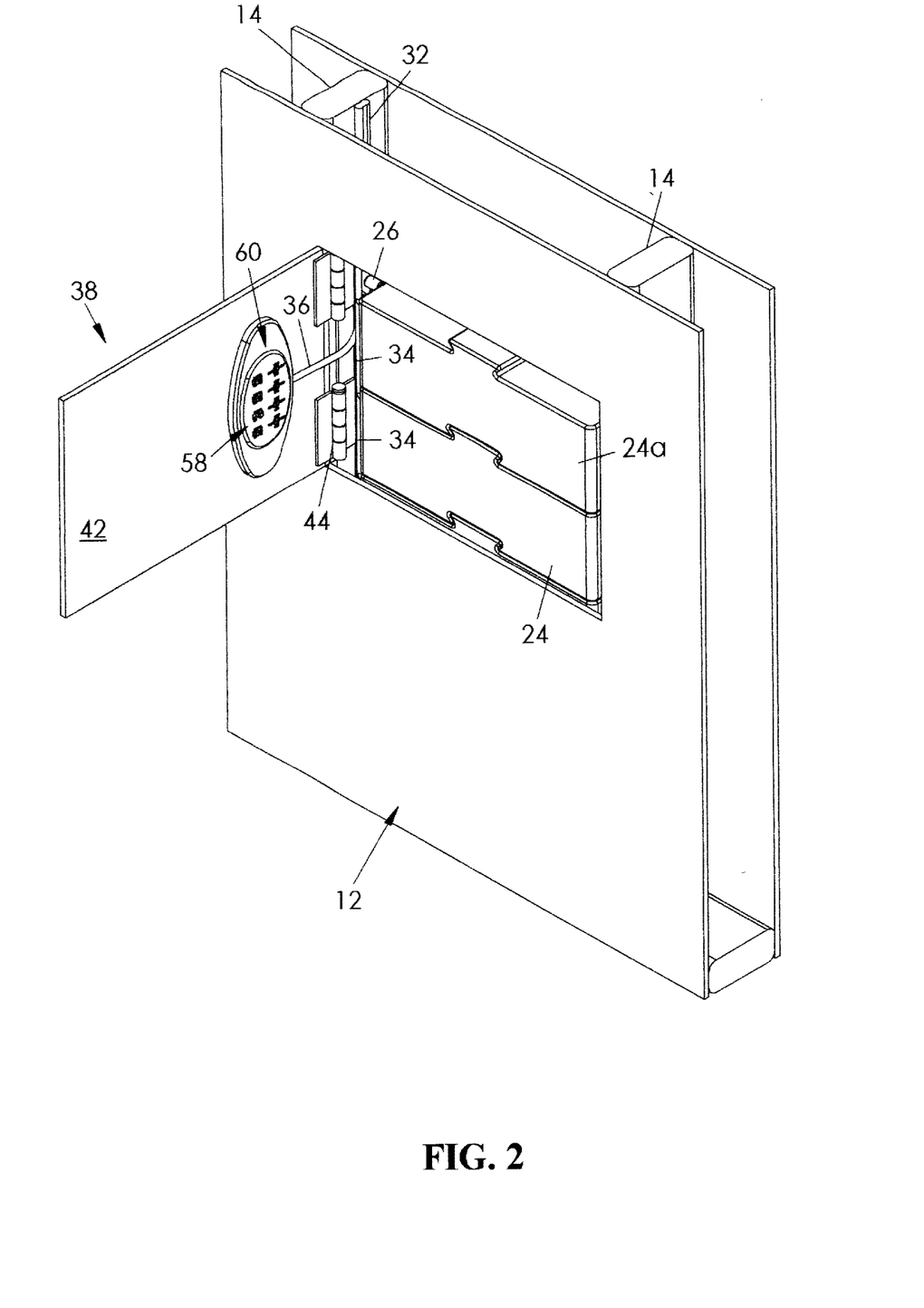
FIG. 2 is another perspective view of the apparatus as in FIG. 1 with a control panel in an open configuration.
Figure 3:
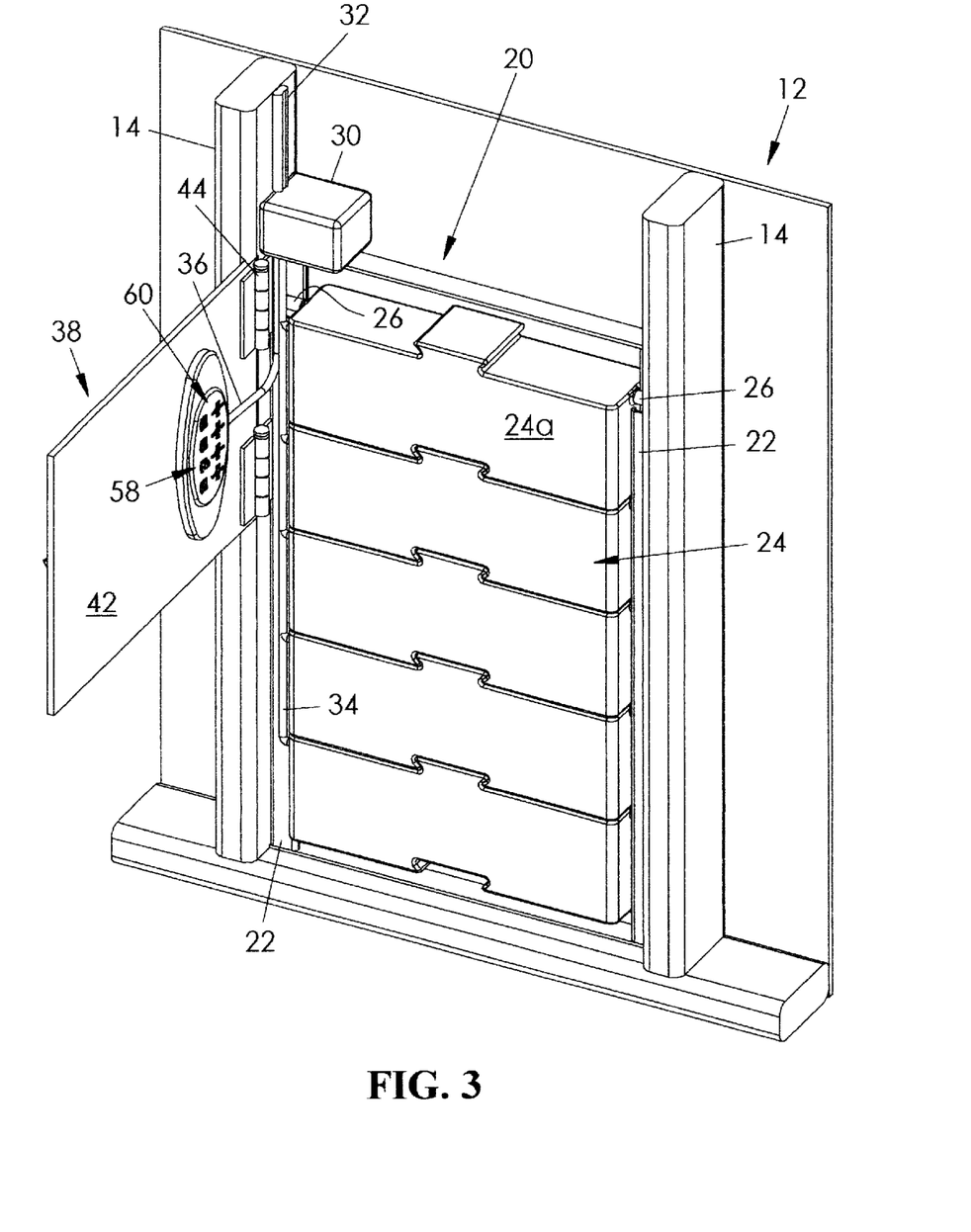
FIG. 3 is a perspective view as in FIG. 2 with a portion of the wall structure removed.

An apparatus 20 according to one embodiment is shown in FIGS. 1 through 6 and includes a pair of elongate guide tracks 22 for vertical mounting to inwardly facing faces of two adjacent studs 14 of a wall structure 12 (FIG. 3). Each guide track 22 defines a channel for receiving a corresponding flange 26 of a storage cell 24, e.g. a rechargeable battery, such that the storage cell 24 is slidably movable in the guide tracks 22. It is understood that the storage cell 24 may be removed from the guide tracks 22. A compression spring 28 is mounted at a bottom of each guide track 22, the compression springs being biased to urge the storage cell 24 in an upward direction along the guide tracks 22 (FIGS. 6B and 6C). Therefore, a plurality of storage cells 24 may be mounted successively to the guide tracks, each additional storage cell being placed atop a previously added storage cell. As additional storage cells 24 are added, the compression springs 28 are further compressed (FIG. 6B). Conversely, as an uppermost storage cell is removed, the compression springs 28 urge the remaining storage cells 24 in an upward direction (FIG. 6C). Thus, the uppermost storage cell 24a is always conveniently accessible to a user. It should be appreciated that the ability to add additional storage cells 24 enables the apparatus 20 to be adapted to the changing electrical backup needs of a user. It is understood that the preferred storage cells for use with this apparatus are rechargeable lithium ion batteries although rechargeable nickel-cadmium batteries would also be suitable.

A control unit 30 for housing apparatus electronics is positioned adjacent one of the guide tracks 22 (FIG. 3). While the control unit 30 may be mounted directly to one of the wall studs 14, it may alternatively be mounted directly to an upper end of a guide track 22. A logic circuit (not shown) is positioned within the control unit 30 for controlling operation of the apparatus 20. The logic circuit is electrically connected to a traditional AC electrical power source through an input cable 32 and to the at least one storage cell 24 via battery power connectors 34 (FIG. 3) It is understood that the logic circuit includes uninterrupted power supply (UPS) circuitry that is conventional relative to facilitating a transfer from AC electrical power to battery power. In addition the logic circuit includes additional circuitry relative to operation of further structures of the apparatus 20 as to be described more fully below.

A control panel 38 having front 40 and back 42 sides is pivotally connected to the wall structure 12 with hinges 44 or like fasteners and is pivotally movable between open and closed configurations. A handle 46 or knob may be fixedly attached to the front side 40 for convenient pivotal user operation of the control panel 38. The control panel 38 should be positioned such that the control unit 30 and uppermost storage cell 24a are accessible when the control panel 38 is in the open configuration. It is understood that all of the structures on the control panel 38 that are described below are electrically connected to the logic circuit through the transfer cable 36 (FIG. 3). A plurality of electrical outlets 48 is mounted on the front side 40 of the control panel 38. While only four outlets are shown, it is understood that many more outlets may be provided so as to provide uninterrupted power to many more electrically powered devices in a home or office setting.

Figure 4:
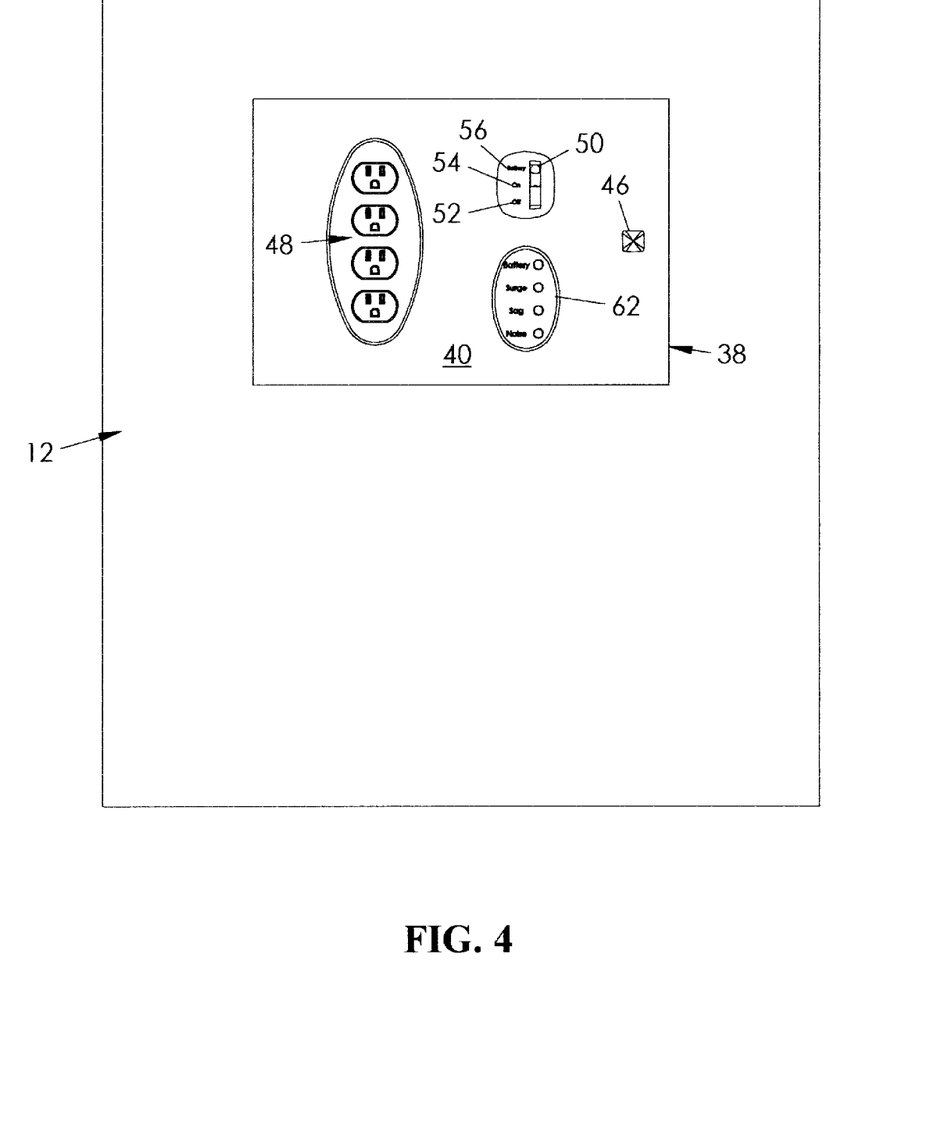
FIG. 4 is a front view of the control panel as in FIG. 1.

Further, a master selector switch 50 is mounted on the front side 40 of the control panel 38 and connected to the logic circuit. The master selector switch 50 may be toggled between "off" 52, "on" 54, and "on-with-battery" 56 configurations (FIG. 4). In the "off" configuration 52, the logic circuit prevents current from both an AC power source and from the storage cells 24 from flowing to the electrical outlets 48. In this mode, the apparatus 20 is essentially inactive as an electrical power source and provides a "safe mode" for accessing internal components and storage cells. In the "on" configuration 54, the logic circuit permits current from a primary power source to flow to the outlets 48 when such power is available, but does not permit current from the storage cell(s) to flow to the outlets 48 even if the primary power source is interrupted. This mode enables a user to determine when it is not desirable to drain storage cell reserves, even if the primary power goes out, such as when no critical devices or data are in use or during long periods of non-use of critical devices. For example, a user may not want to risk draining the storage cells merely to sustain operation of a lamp while the user is on vacation.

In the "on-with-battery" configuration 56, the logic circuit allows current to flow from the primary AC power source to the electrical outlets when such power is available but transfers to storage cell power if the primary power source becomes unavailable. A user would select this mode when critical devices are in use and that would need uninterrupted power. Therefore, the master selector switch 50 provides optimum user control over when the electrical outlets 48 may receive primary power and when they may receive power from the storage cell(s) should the primary power source be interrupted.

Figure 5A:
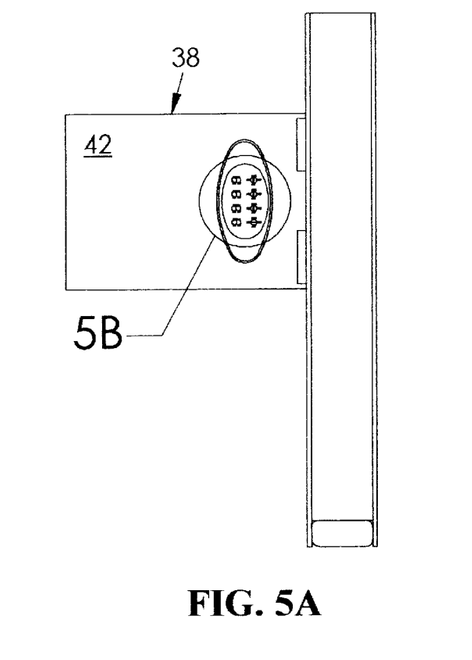
FIG. 5A is a side view of the apparatus as in FIG. 2 showing a back side of the control panel.
Figure 5B:
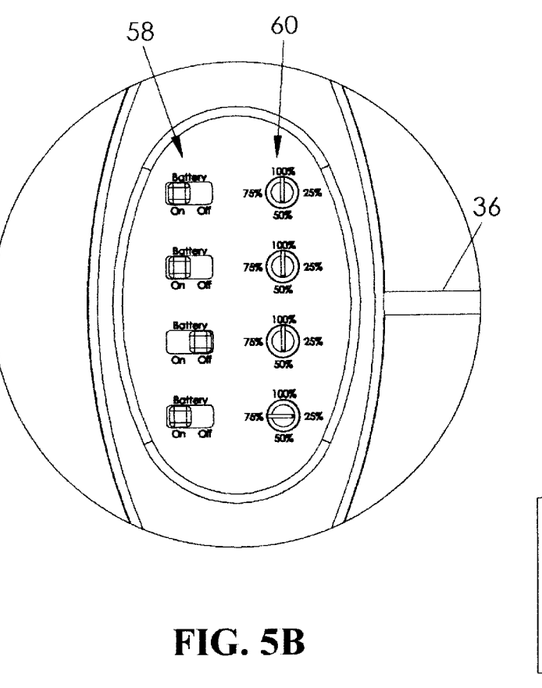
FIG. 5B is an isolated view on an enlarged scale of the individual selector switches and voltage dials as in FIG. 5A.
Figure 6A:
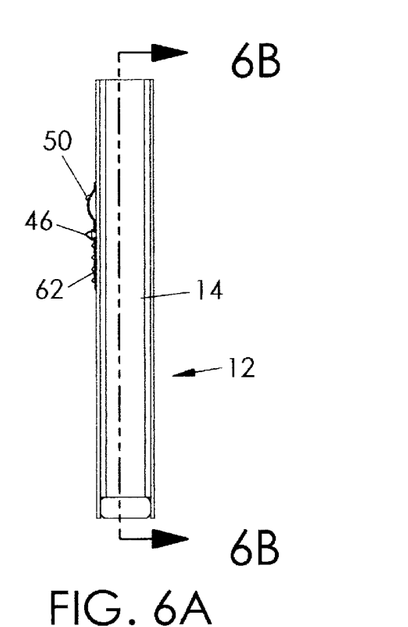
FIG. 6A is a side view of the apparatus as in FIG. 1.
Figure 6B:
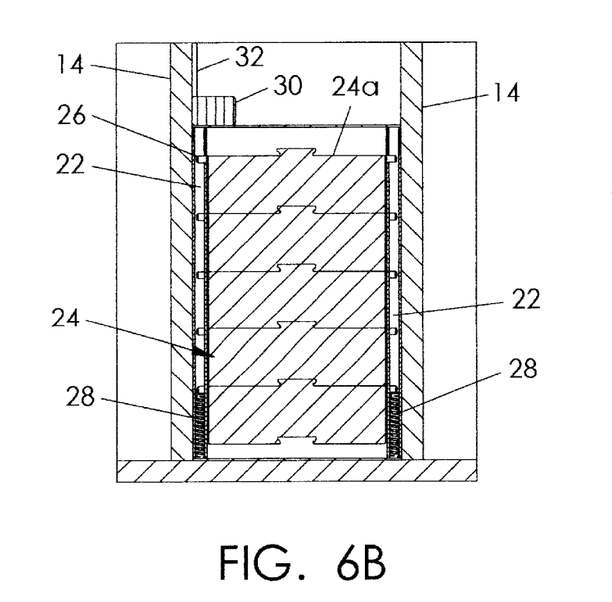
FIG. 6B is a sectional view of the apparatus taken along line 6B—6B of FIG. 6A.
Figure 6C:
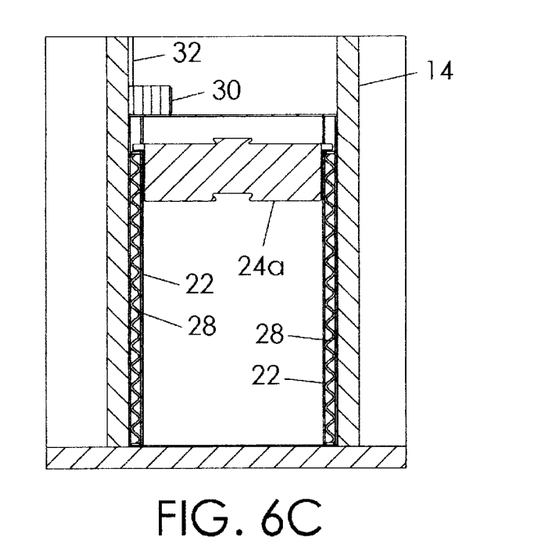
FIG. 6C is another sectional view as in FIG. 6B after removal of multiple storage cells.

A plurality of individual selector switches 58 is mounted to the back side 42 of the control panel 38 and electrically connected to the logic circuit (FIG. 5B). Each individual selector switch 58 is also connected to a corresponding electrical outlet 48 and may be toggled between "on" and "off" positions. In the "on" configuration, current is permitted to flow from the storage cell 24 to the corresponding outlet when power from the primary source is unavailable. Otherwise, storage cell power is reserved and cannot flow to the corresponding outlet. Therefore, the individual selector switches 58 enable a user to individually determine which electrical outlets 48 should be capable of receiving battery backup power. This recognizes that devices are frequently moved around and plugged into different outlets and that changing the battery backup configurations accordingly should be efficient and user-friendly. Further, it is understood that the master selector switch 50 would need to be in the "on-with-battery" configuration 58 in order for the individual selector switches 58 be useful.

Further, a plurality of voltage dials 60 is mounted to the back side 42 of the control panel 38. Similar to the individual selector switches 58 described above, the voltage dials 60 are connected to the logic circuit and correspondingly connected to the electrical outlets 48. Each voltage dial 60 may be rotated 360° corresponding to a percentage reduction in the voltage of current flowing to a corresponding electrical outlet. For example, electric devices such as lights or electric heaters can draw an excessive amount of power at full wattage. Therefore, a user may choose to lower the voltage of the current flowing to such devices when they are operating on storage cell power so as to limit the drain thereon.

A display panel 62 is mounted to the front side of the control panel 38 (FIG. 4) and is electrically connected to the logic circuit via the transfer cable 36. The display panel 62 includes a plurality of LED's and indicia corresponding to various events that may be sensed by the logic circuit. More particularly, the conventional UPS circuitry included in the logic circuit is capable of indicating when current flow has switched from the primary power source and the storage cells 24. Upon this occurrence, the logic circuit will cause an appropriate LED to be illuminated. Similarly, the logic circuit is capable of sensing a surge or sag in the flow of primary current as well as when the current includes "noise". Upon these occurrences, the logic circuit will cause appropriate LED's on the display panel 62 to be illuminated.

In addition, the logic circuit may include or be connected to a database (not shown) capable of recording predetermined types of information. The database includes data fields associated with electrical power sags, surges, and noise, as well as power outage time and duration, and storage cell power consumption. It is understood that data collected in this database during operation of the apparatus 20 may be accessed by a user through a conventional computer interface or network connection and is helpful for managing and planning future power consumption and power maintenance needs.

In use, a user may plug multiple electronic devices into respective electrical outlets 48 of the apparatus 20. Then, the user may use the master selector switch 50 to set the desired electrical output configuration. If the master selector switch 50 is moved to the "on" configuration 54, then primary AC power will be delivered to the electrical outlets with no storage cell backup in case the primary power interruption. This mode is desirable when the devices connected to the apparatus 20 are not worthy of draining storage cell power in case of a primary power outage, e.g. lamps, printers, heaters, etc. If sensitive electrical devices are connected to the outlets, the user may select the battery mode (e.g. the "on-with-battery" configuration) in which storage cell power will be transferred immediately to the outlets 48 should primary power be unavailable. Individual selector switches 58 may be configured as well for determining which individual electrical outlets 48 may receive storage cell 24 power in the event of a primary power outage. In addition, voltage dials 60 corresponding to individual electrical outlets 48 may be adjusted to limit the amount of storage cell 24 power that will be allowed to flow to particular outlets 48. Therefore, the user has convenient and direct control over how storage cell power reserves are to be distributed to the outlets 48 and under what conditions.

Figure 7:
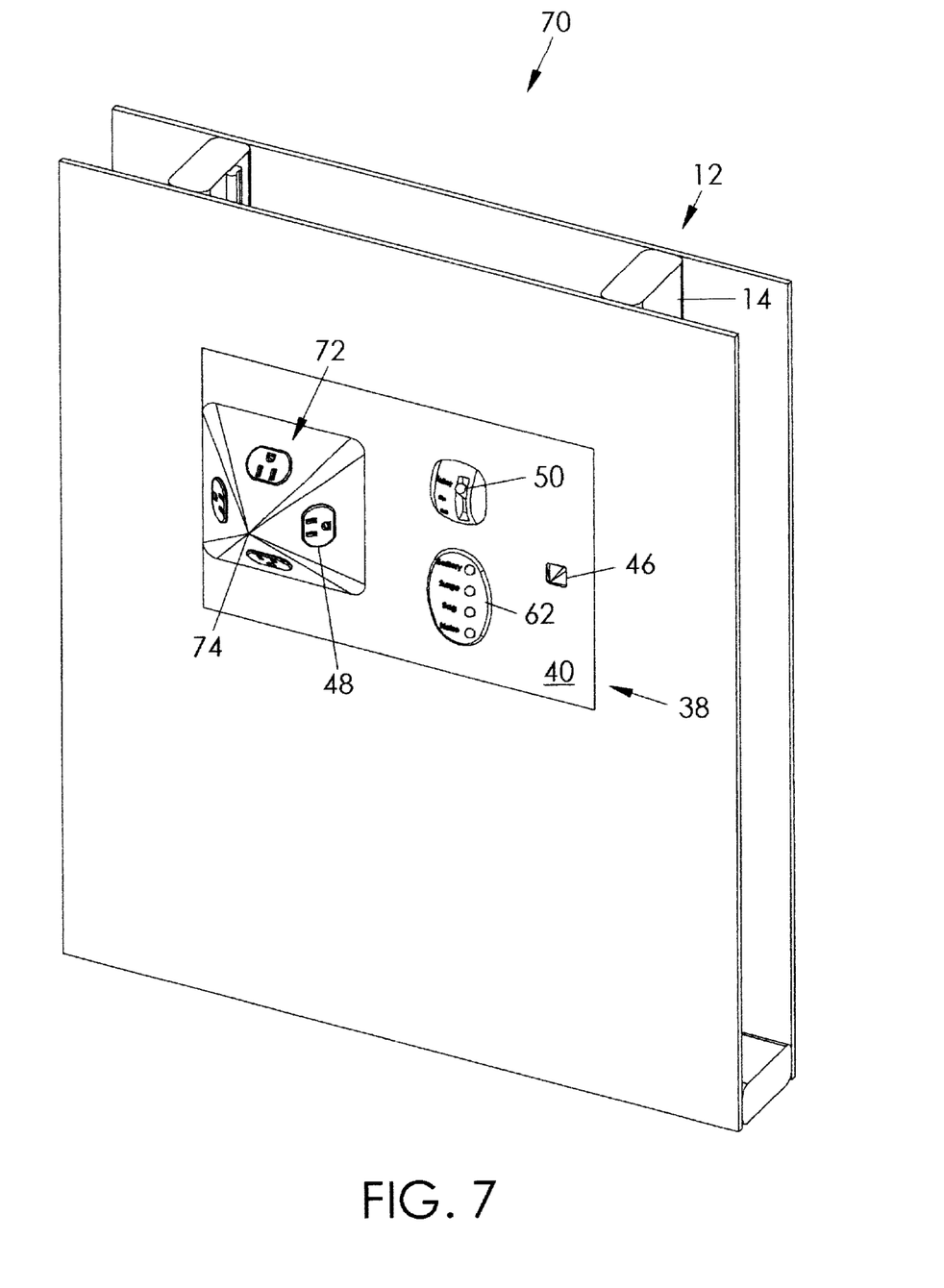
FIG. 7 is a perspective view of an apparatus for supplying uninterrupted power according to another embodiment of the present invention.

Another apparatus 70 for providing uninterrupted power is shown in FIG. 7 and includes a construction substantially similar to the construction described above except as specifically noted below. This apparatus 70 includes a receptacle housing 72 mounted on the front side 40 of the control panel 38. The receptacle housing 72 includes a plurality of triangular panels extending outwardly from the front side 40 of the control panel 38 and converging at an apex 74. The plurality of electrical outlets 48 are positioned on respective panels. This configuration enables the power cords of electrical devices to be spaced apart and better distinguished and manipulated for user convenience. It also provides a desirable aesthetic appearance having a connotation of a high technology energy providing apparatus.

Figure 10:
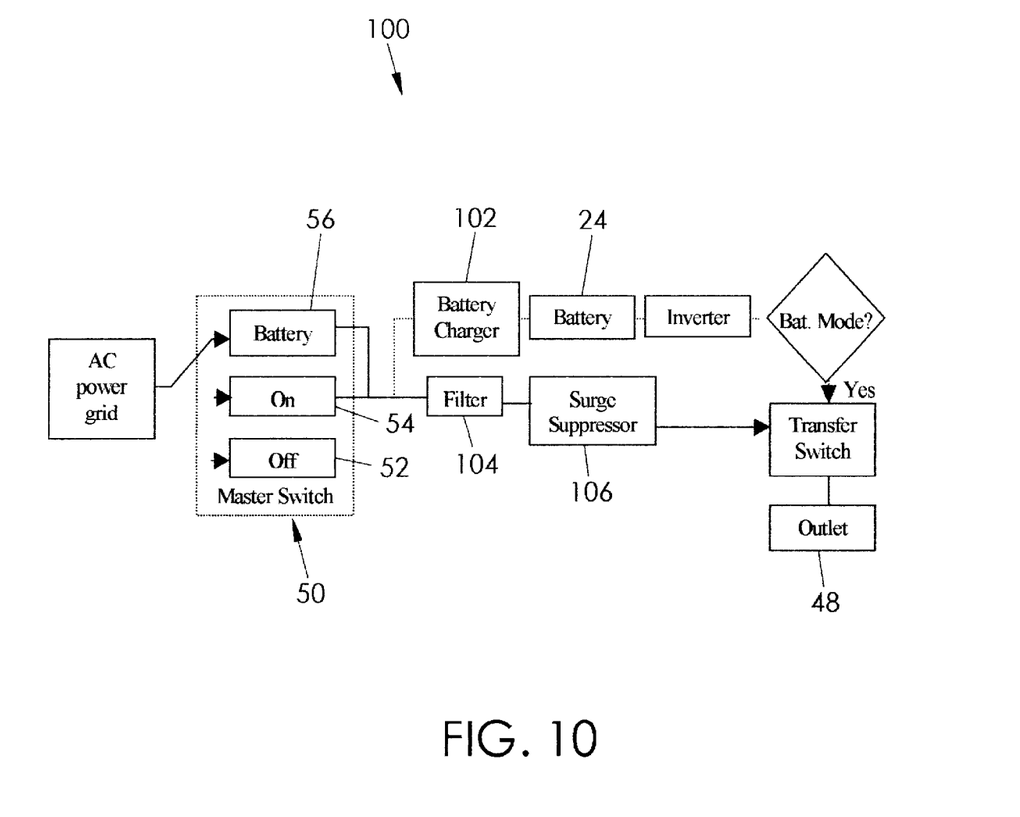
FIG. 10 is a block diagram of an apparatus for supplying uninterrupted power according to yet another embodiment of the present invention.

Another apparatus 100 for providing uninterrupted power is shown in FIG. 10 and includes a construction substantially similar to the constructions described previously except as noted below. In this apparatus 100, a battery charging device 102 is positioned in the control unit and connected to the logic circuit for charging the storage cell 24 with AC power from the primary power source whenever current from that primary source is available (FIG. ??). More particularly, the battery charging device 102 utilizes AC power to charge the storage cell 24 when the master selector switch is in either the "on" configuration 54 or the "on-with-battery" configuration 56. The expanded circuitry of this embodiment may also include a filter 104 for minimizing the effect of noise in the current flow and may include a surge protector 106 for inhibiting damage caused by an electrical surge.

Figure 8:
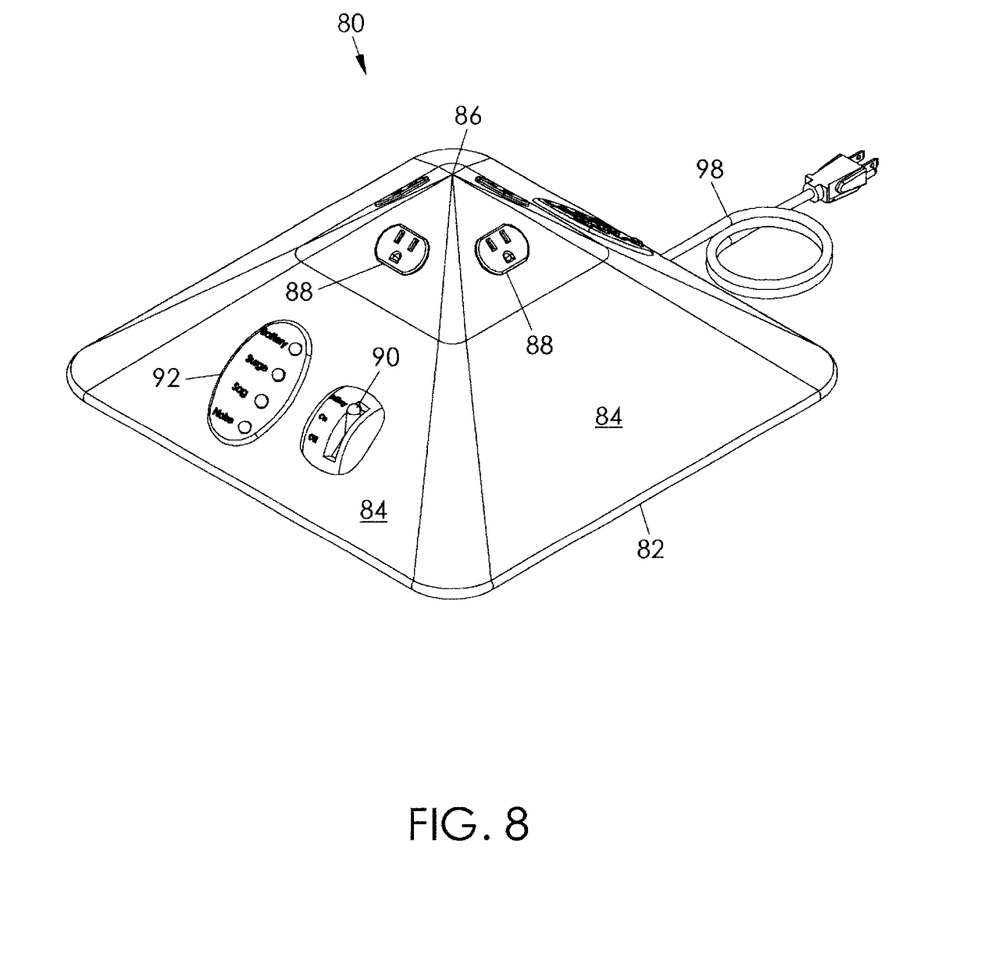
FIG. 8 is a front perspective view of an apparatus for supplying uninterrupted power according to still another embodiment of the present invention.
Figure 9:
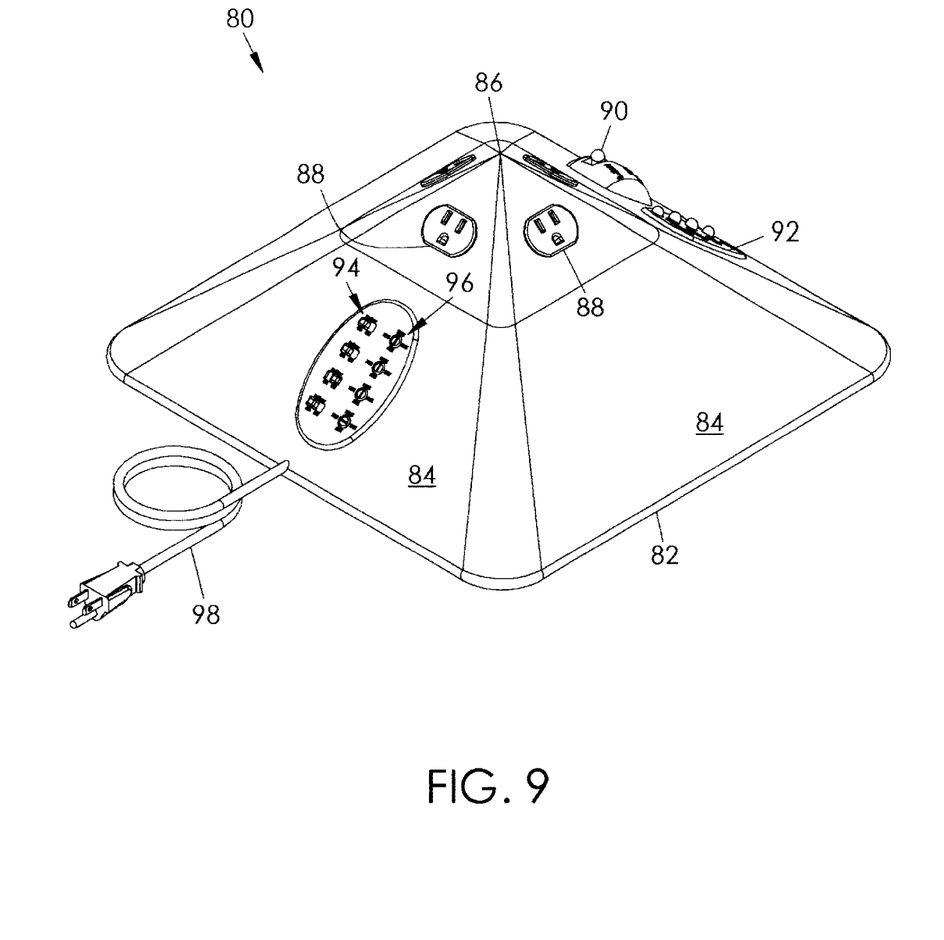
FIG. 9 is a rear perspective view of the apparatus as in FIG. 8.

Another apparatus 80 according to the present invention is shown in FIGS. 8 and 9 and provides a portable version of the devices described above. This apparatus 80 includes a housing having a bottom 82 with a plurality of triangular side walls 84 extending upwardly from the bottom 82 and converging at an apex 86. The housing defines an interior space in which a logic circuit and storage cells may be positioned for operation as previously described. A plurality of electrical outlets 88 are positioned on respective side walls 84. A master selector switch 90, display panel 92, individual selector switches 94, and voltage dials 96 are also positioned on respective side walls 84 and function in a manner substantially similar to that described above. A power cord 98 connected to the logic circuit extends from the housing for connection to a primary AC power source. Therefore, the apparatus 80 according to this embodiment may be moved to a desired location as desired by a user for providing a full featured uninterrupted power source where needed.

It is understood that while certain forms of this invention have been illustrated and described, it is not limited thereto except insofar as such limitations are included in the following claims and allowable functional equivalents thereof.

Having thus described the invention, what is claimed as new and desired to be secured by letters patent is as follows:

1. An apparatus positioned between a pair of adjacent studs of a wall structure for selectively delivering uninterrupted electrical power, comprising:
   a pair of guide tracks vertically mounted to opposing inward faces of the adjacent studs;
   at least one rechargeable storage cell;
   means for mounting said at least one storage cell for slidable movement along said pair of guide tracks;
   a control unit positioned adjacent one of said pair of guide tracks, said control unit including a logic circuit electrically connected to a power source and to said at least one storage cell;
   a control panel pivotally coupled to the wall structure for movement between an open configuration providing access to said at least one storage cell and a closed configuration;
   a plurality of electrical outlets positioned on a front side of said control panel and electrically connected to said at least one storage cell and to said power source; and means in said logic circuit for permitting current to flow selectively from said power source or said at least one storage cell to said plurality of electrical outlets.

2. The apparatus as in claim 1 wherein said means for mounting said at least one storage cell includes a pair of compression springs positioned within said pair of guide tracks, said springs being biased for urging said at least one storage cell in an upward direction along said pair of guide tracks.

3. The apparatus as in claim 2 further comprising:
a master selector switch positioned on said front side of said control panel and electrically connected to said logic circuit, said master selector switch being movable between "off", "on", and "on-with-battery" configurations;
means in said logic circuit for disconnecting said power source and said at least one storage cell from said plurality of electrical outlets when said master selector switch is in said "off" configuration;
means in said logic circuit for permitting current to flow from said power source to said plurality of electrical outlets when said master selector switch is in said "on" configuration;
means in said logic circuit for permitting current to flow from said power source to said plurality of electrical outlets when said master selector switch is in said "on-with-battery" configuration and current is available from said power source; and
means in said logic circuit for permitting current to flow from said at least one storage cell to said plurality of electrical outlets when said master selector switch is in said "on-with-battery" configuration and current is not available from said power source.

4. The apparatus as in claim 1 further comprising:
a master selector switch positioned on said front side of said control panel and electrically connected to said logic circuit, said master selector switch being movable between "off", "on", and "on-with-battery" configurations;
means in said logic circuit for disconnecting said power source and said at least one storage cell from said plurality of electrical outlets when said master selector switch is in said "off" configuration;
means in said logic circuit for permitting current to flow from said power source to said plurality of electrical outlets when said master selector switch is in said "on" configuration;
means in said logic circuit for permitting current to flow from said power source to said plurality of electrical outlets when said master selector switch is in said "on-with-battery" configuration and current is available from said power source; and
means in said logic circuit for permitting current to flow from said at least one storage cell to said plurality of electrical outlets when said master selector switch is in said "on-with-battery" configuration and current is not available from said power source.

5. The apparatus as in claim 4 further comprising a plurality of battery selector switches positioned on a back side of said control panel and electrically connected to corresponding electrical outlets and to said logic circuit, each battery selector switch being movable between an "on" configuration in which current may be delivered from said at least one storage cell to a respective electrical outlet and an "off" configuration in which current may not be delivered from said at least one storage cell to said respective electrical outlet.

6. The apparatus as in claim 2 further comprising a plurality of battery selector switches positioned on a back side of said control panel and electrically connected to corresponding electrical outlets and to said logic circuit, each battery selector switch being movable between an "on" configuration in which current may be delivered from said at least one storage cell to a respective electrical outlet and an "off" configuration in which current may not be delivered from said at least one storage cell to said respective electrical outlet.

7. The apparatus as in claim 1 further comprising a plurality of battery selector switches positioned on a back side of said control panel and electrically connected to corresponding electrical outlets and to said logic circuit, each battery selector switch being movable between an "on" configuration in which current may be delivered from said at least one storage cell to a respective electrical outlet and an "off" configuration in which current may not be delivered from said at least one storage cell to said respective electrical outlet.

8. The apparatus as in claim 6 further comprising a plurality of dials rotatably mounted on said back side of said control panel and electrically connected to corresponding electrical outlets and to said logic circuit for selectively increasing or decreasing a voltage of current flowing to said corresponding electrical outlets.

9. The apparatus as in claim 1 further comprising a plurality of dials rotatably mounted on said back side of said control panel and electrically connected to corresponding electrical outlets and to said logic circuit for selectively increasing or decreasing a voltage of current flowing to said corresponding electrical outlets.

10. The apparatus as in claim 1 further comprising a receptacle housing having a plurality of triangular panels extending outwardly from said front side of said control panel and converging at an apex, said plurality of electrical outlets being spaced apart on said receptacle housing.

11. The apparatus as in claim 1 wherein said logic circuit includes a database having data fields associated with sags, surges, noise, power outage time and duration, and battery power consumption.

12. An apparatus positioned between a pair of adjacent studs of a wall structure for selectively delivering uninterrupted electrical power, comprising:
a pair of guide tracks vertically mounted to opposed inward faces of the adjacent studs, said pair of guide tracks adapted to removably receive a plurality of rechargeable batteries in succession;
a pair of compression springs positioned within said pair of guide tracks and biased for urging said plurality of rechargeable batteries in an upward direction along said pair of guide tracks;
a control unit mounted adjacent one of said pair of guide tracks and defining an interior space, said control unit having a logic circuit positioned in said interior space thereof and electrically connected to an electrical power source and to said plurality of rechargeable batteries;
a control panel pivotally coupled to the wall structure for movement between an open configuration providing access to upper ends of said pair of guide tracks and a closed configuration concealing said pair of guide tracks;
a plurality of electrical outlets positioned on a front side of said control panel and electrically connected to said plurality of rechargeable batteries and to said electrical power source;

a master selector switch positioned on said front side of said control panel and electrically connected to said logic circuit, said master selector switch being movable between "off", "on", and "on-with-battery" configurations;

means in said logic circuit for disconnecting said power source and said plurality of rechargeable batteries from said plurality of electrical outlets when said master selector switch is in said "off" configuration;

means in said logic circuit for permitting current to flow from said power source to said plurality of electrical outlets when said master selector switch is in said "on" configuration;

means in said logic circuit for permitting current to flow from said power source to said plurality of electrical outlets when said master selector switch is in said "on-with-battery" configuration and current is available from said power source; and means in said logic circuit for permitting current to flow from said at least one storage cell to said plurality of electrical outlets when said master selector switch is in said "on-with-battery" configuration and current is not available from said power source.

13. The apparatus as in claim 12 further comprising a plurality of battery selector switches positioned on a back side of said control panel and electrically connected to corresponding electrical outlets and to said logic circuit, each battery selector switch being movable between an "on" configuration in which current may be delivered from said plurality of rechargeable batteries to a respective electrical outlet and an "off" configuration in which current may not be delivered from said plurality of rechargeable batteries to said respective electrical outlet.

14. The apparatus as in claim 13 further comprising a plurality of dials rotatably mounted on said back side of said control panel and electrically connected to corresponding electrical outlets and to said logic circuit for selectively increasing or decreasing a voltage of current being delivered to said corresponding electrical outlets.

15. The apparatus as in claim 12 further comprising a plurality of dials rotatably mounted on said back side of said control panel and electrically connected to corresponding electrical outlets and to said logic circuit for selectively increasing or decreasing a voltage of current being delivered to said corresponding electrical outlets.

16. The apparatus as in claim 12 further comprising a receptacle housing having a plurality of triangular panels extending outwardly from said front side of said control panel and converging at an apex, said plurality of electrical outlets being spaced apart on said receptacle housing.

17. The apparatus as in claim 12 wherein said logic circuit includes a battery charger module electrically connected to said electrical power source and to said plurality of rechargeable batteries, said battery charger module utilizing current from said electrical power source to charge said plurality of rechargeable batteries when said master selector switch is in said "on-with-battery" configuration.

18. A portable apparatus for delivering uninterrupted electrical power, comprising:

a housing having a bottom with a plurality of triangular side walls extending upwardly from said bottom and converging at an apex, said housing defining an interior space;

a logic circuit positioned in said interior space of said housing;

a power cord extending from said housing for electrically connecting said logic circuit to an electrical power source;

at least one rechargeable storage cell positioned in said housing and electrically connected to said logic circuit;

a plurality of electrical outlets spaced apart on said plurality of side walls of said housing, each electrical outlet being electrically connected to said at least one storage cell and to said power cord;

a master selector switch positioned on one of said plurality of side walls and electrically connected to said logic circuit, said master selector switch being movable between "off", "on", and "on-with-battery" configurations;

means in said logic circuit for disconnecting said power cord and said plurality of rechargeable batteries from said plurality of electrical outlets when said master selector switch is in said "off" configuration;

means in said logic circuit for permitting current to flow through said power cord to said plurality of electrical outlets when said master selector switch is in said "on" configuration;

means in said logic circuit for permitting current to flow through said power cord to said plurality of electrical outlets when said master selector switch is in said "on-with-battery" configuration and current is available from said power cord; and means in said logic circuit for permitting current to flow from said at least one storage cell to said plurality of electrical outlets when said master selector switch is in said "on-with-battery" configuration and current is not available from said power cord.

19. The apparatus as in claim 18 further comprising a plurality of battery selector switches positioned on one of said plurality of side walls and electrically connected to corresponding electrical outlets and to said logic circuit, each battery selector switch being movable between an "on" configuration in which current may be delivered from said at least one storage cell to a respective electrical outlet and an "off" configuration in which current may not be delivered from said at least one storage cell to said respective electrical outlet.

20. The apparatus as in claim 18 further comprising a plurality of dials rotatably mounted on one of said plurality of side walls and electrically connected to corresponding electrical outlets and to said logic circuit for selectively increasing or decreasing a voltage of current flowing to said corresponding electrical outlets.

* * * * *